United States Patent [19]

Kemper

[11] 4,109,569
[45] Aug. 29, 1978

[54] DOUGH MAKEUP LINE FOR THE SELECTIVE PRODUCTION OF DIFFERENT KINDS OF BREAD

[76] Inventor: Kate Kemper, Wybuelstrasse, 6, 8702 Zurich-Zollikon, Switzerland

[21] Appl. No.: 669,098

[22] Filed: Mar. 22, 1976

[30] Foreign Application Priority Data

Mar. 22, 1975 [DE] Fed. Rep. of Germany ....... 2512776

[51] Int. Cl.² .................. A21C 13/02; A21C 3/02; A21C 5/00
[52] U.S. Cl. .................. 99/483; 99/443 C; 99/477; 198/369; 198/424; 198/601; 198/631; 425/371
[58] Field of Search ................. 99/352–353, 99/355, 386, 404, 423, 424, 443 R, 443 C, 468, 477, 478, 483; 198/366, 369, 424, 601, 622, 631; 425/305 R, 371, 364 R; 34/203, 205; 426/496, 500, 503

[56] References Cited

U.S. PATENT DOCUMENTS

| 2,883,033 | 4/1959 | Armstrong | 198/601 |
| 2,897,772 | 8/1959 | Hunter | 99/352 |
| 3,111,913 | 11/1963 | Mladek | 99/353 |

FOREIGN PATENT DOCUMENTS

| 2,223,945 | 10/1974 | France | 99/483 |
| 1,009,123 | 5/1957 | Fed. Rep. of Germany | 99/353 |

*Primary Examiner*—Harvey C. Hornsby
*Assistant Examiner*—Robert Pous
*Attorney, Agent, or Firm*—Joseph A. Geiger

[57] ABSTRACT

A dough makeup line for the selective mechanized production of different kinds of bread such as long bread and flat bread, the makeup line including a dough divider, a dough piece rounder, a proofer, and, as part of the proofer, a switchable dough piece delivery device cooperating with two parallel longitudinal dough molding lines equipped with molding stations for different bread shapes, the longitudinal dough molding lines leading to a transverse dough molding line, from where the molded dough pieces are transferred onto baking palettes. Special transfer conveyors are employed in connection with the makeup of thin, large dough pieces.

20 Claims, 8 Drawing Figures

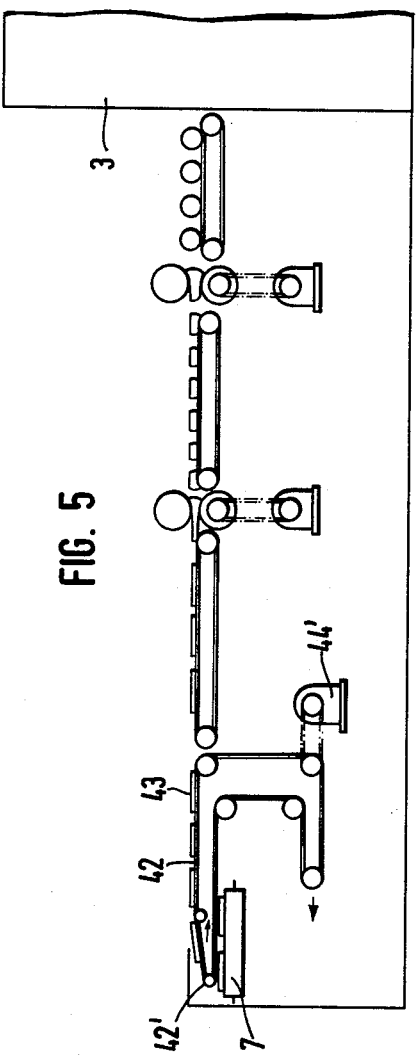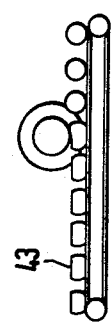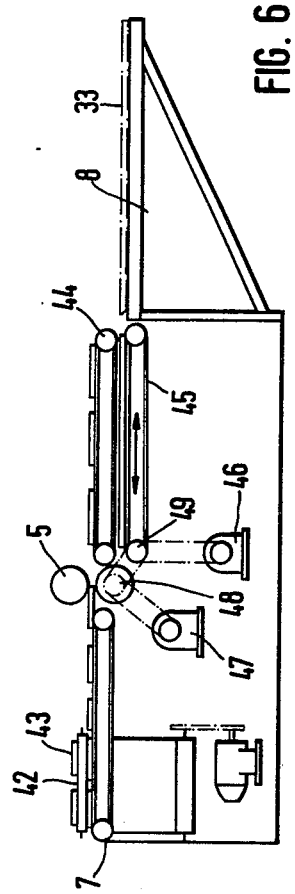

DOUGH MAKEUP LINE FOR THE SELECTIVE PRODUCTION OF DIFFERENT KINDS OF BREAD

BACKGROUND OF THE INVENTION

1. Field of the Invention

The present invention relates to mechanized bakery equipment, and more particularly to machinery for the automatic makeup of bread dough into dough pieces ready for baking in a continuous operation, the specific equipment being readily adaptable for the production of at least two different kinds of bread.

2. Description of the Prior Art

Bread or bread-like products have historically been by far the most important of all food staples. The growing mobility of large segments of population from one region to another as well as from country to country has brought with it corresponding changes in the bread eating habits of local populations. The bread producers, therefore, hve found it to be a necessity to offer as many different products as possible. However, this desire to offer a variety of bread products conflicts sharply with the rising tendency towards mechanization of all bakery operations. Normally, mechanization is only then possible and profitable, when one particular kind of bread is to be produced on a continuous basis.

Known mechanized equipment for continuous baking operations is commonly arranged in the form of a processing line, particularly in the case of dough piece makeup equipment which shapes the dough pieces for baking. Such a dough makeup line may include a dough divider at the beginning of the line, followed by a dough piece rounder and a fermenting unit or proofer from where the dough pieces move to dough piece molding equipment, including stretch molding and roll-molding devices and devices for the transfer of the molded dough pieces to baking palettes.

An important prerequisite for this type of dough piece makeup machinery is that it is to operate fully automatically and on a continuous basis. It follows that equipment which is capable of meeting these requirements is normally limited to one particular kind of bread, or, if it is adaptable to different kinds of bread, requires an extensive shutdown and complicated modifications.

The different kinds of bread which are to be produced, if an adequate variety of breads are to be offered, differ not only in terms of the types of flour used, they also call for widely differing weights and shapes. For instance, while the general preference in Europe goes to long breads such as panned loaves, southern countries have a preference for flat breads, for example.

SUMMARY OF THE INVENTION

Underlying the present invention is the primary objective of devising an improved dough makeup line which is adapted for the selective production of several kinds of bread, particularly the selective production of round flat bread and of so called "European" bread, in the form of long loaves.

It is a more specific objective of the present invention to suggest equipment for the selective automatic production of so-called barbary bread and of so-called taftoun bread, as well as the European bread. The equipment is to be so designed that the complete makeup line requires a minimum of floor space and that the machinery units are utilized in an optimal way.

The term "barbary bread" refers to a long bread having a height of approximately 15 mm and an elongated shape, whereas "taftoun bread" refers to a flat bread of approximately 360 mm diameter and some 6 to 7 mm thickness.

A particular source of problems relating to the selective production of differently shaped bread lies in the automatic transfer of the molded dough pieces onto the baking palettes, particularly in cases where the molded dough pieces are of the large flat type, the transfer from a conveyor belt to the baking palettes requiring special care, in order to avoid the creation of folds in the dough pieces.

A still further objective of the present invention relates to the transfer of the molded dough pieces to the baking palettes in such a way that the available space on each palette is utilized optimally, in order to optimize the usage of the space inside the baking oven.

The present invention proposes to attain the above objectives by suggesting an improved dough makeup line of the earlier-mentioned type in which the fermenting unit or proofer is equipped with a dough piece delivery device which is arranged to selectively cooperate with one of several differently equipped dough molding lines, the latter being arranged side by side in parallel alignment, discharging the partially molded dough pieces onto a common transverse dough molding line with one or several rolling stations, and leading to a palette loading device which is operated intermittently and in synchronism with the main equipment drive of the proofer. This main equipment drive includes control devices for the maintenance of a synchronous operational cycle for the entire makeup line.

According to a preferred embodiment of the invention, the dough piece delivery device of the proofer includes a conveyor belt leading to a first dough piece delivery station, this delivery station being bypassable with the aid of a pivotably or otherwise removably arranged second conveyor belt leading to a further dough piece delivery station. Each dough piece delivery station includes preferably a dough chute over which the dough pieces, after leaving the end of the conveyor belt of the delivery device, glide onto the conveyor belt of a dough molding line arranged below it and moving at right angles to the conveyor belt of the delivery device.

The fermenting device or proofer, which constitutes the central unit of the makeup line and includes the main equipment drive, has a number of parallel arranged proofing trains. The dough pockets of each proofing train are loaded with dough pieces by means of an automatic loading device which is switchable from proofing train to proofing train.

In a modified embodiment of the invention, the proofer is equipped with several aligned proofing trains which are arranged in succession and cooperate in series with one another. In this case, the automatic loading device delivers all dough pieces to the pockets of the first proofing train, an automatic transfer of the dough pieces to the second and subsequent proofing trains taking place inside the proofer itself.

It is a characteristic suggestion of the present invention that one of the longitudinal dough molding lines be equipped for the makeup of European bread and for the makeup of barbary bread. Such a molding line includes a pressure table and, behind the latter, a stretch molder in the form of a counter-travelling belt. The stretch molder may be equipped to operate both as a pressure table and as a counter-travelling belt.

A second longitudinal dough molding line, arranged parallel to the first-mentioned line for long bread, is equipped for the molding of flat bread. For this purpose, the molding line includes a rolling station. The transfer of the flattened dough pieces from this molding line to a subsequent transversely arranged dough molding line requires a special transfer device between the two lines.

The transversely oriented dough molding line is thus equipped to selectively cooperate with the one or the other of at least two parallel longitudinal dough molding lines. Along the length of the transverse dough molding line are arranged several additional rolling stations which can be rendered inoperative, depending on the particular dough molding requirements. The selectively operable rolling stations along this line make it possible to process both dough pieces for European long bread and dough pieces for barbary bread, using a height-adjustable grooved roller. At the discharge end of the transverse dough molding line is arranged another transfer device by means of which the molded dough pieces are deposited onto suitable baking palettes.

The preferred embodiment of the invention further includes, as part of the main equipment drive which is associated with the proofing unit, suitable drive transmission shafts, including universal joints and chain drives, for the operation of the dough molding lines and of the dough piece transfer devices, including, if necessary, a reciprocating palette loading device.

All component units of the dough makeup line thus cooperate with each other in synchronism. Where the dough pieces pass through a rolling station on a molding line, the conveyor sections ahead and behind the rolling station are driven with different speeds, the speed of the departing conveyor being preferably approximately 50 percent higher than the speed of the arriving conveyor.

The transfer of large thin dough pieces from the last dough molding line to the baking palettes requires a transfer device which includes special means for moving each baking palette underneath the discharging conveyor, the palette being moved either manually by an operator, or automatically by means of a reciprocating chain conveyor. In the latter case, the chain conveyor includes a disengageable forward drive which operates in synchronism with the conveyor of the transverse dough molding line and a reverse drive which, during the time in which the forward drive is disengaged, moves the baking palette under the conveyor of the dough molding line. The movements of the chain conveyor for the baking palettes are adjustable, preferable by means of an adjustable control cam and cooperating end switches, so that one or more dough pieces can be deposited onto the baking palette, depending on the dimensions of the dough pieces.

Thus, while it may be desirable to use separate baking palettes for taftoun bread, because of its large diameter (360 mm) a single baking palette may carry two or more dough pieces for other kinds of bread which require less space on the palette. For this purpose, the reciprocating chain conveyor may be arranged to move forwardly in successive steps. However, since the spacing of the dough pieces on the dough molding conveyor is in most cases much greater than the optimal spacing which one would want to have on a baking palette, the movement of the chain conveyor of the transfer device is preferably set to execute a so-called pilgrim step, backing up a short distance after every advancing step.

In an alternative embodiment of the aforementioned transfer device, the chain conveyor for the baking palettes has a drive which includes an escape mechanism, for instance an escape disc, which, at the end of each forward movement, releases the drive connection, whereupon the chain conveyor is backed up a short distance through the action of a return spring. The length of this back-up motion is adjustable by means of adjustable stops.

BRIEF DESCRIPTION OF THE DRAWINGS

Further special features and advantages of the invention will become apparent from the description following below, when taken together with the accompanying drawings which illustrate, by way of example, several embodiments of the invention, represented in the various figures as follows:

FIG. 2a shows the selective dough piece delivery device of the proofer in a side elevation;

FIG. 5 is a somewhat enlarged schematic elevational view of the second longitudinal dough molding line of the makeup equipment of FIG. 4;

FIG. 6 is a similarly enlarged elevational side view of a transverse dough molding line, as part of one of the two embodiments shown; and FIG. 7 shows a dough piece rolling station.

DESCRIPTION OF THE PREFERRED EMBODIMENTS

Figure 1:
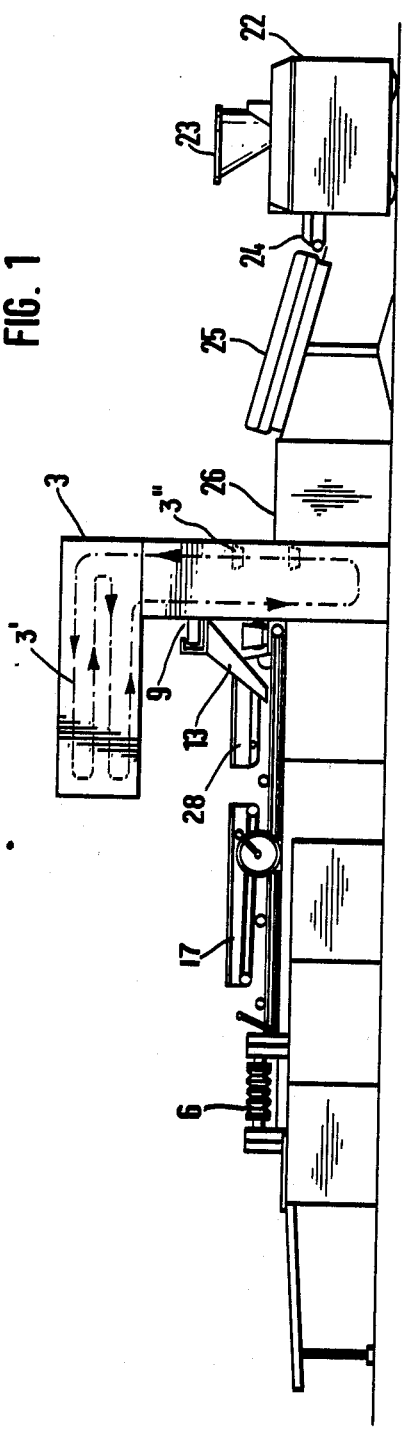
FIG. 1 shows, in a schematic elevational view, a dough makeup line embodying the present invention.

Referring to FIG. 1 of the drawing, there is shown a schematic elevational view of a mechanized dough makeup line for the selective production of different kinds of bread in accordance with the present invention. This makeup line includes, in succession, a dough divider 22 receiving mixed fermented dough through its funnel 23, the dough coming for example from a dough mixing machine and being transported by means of a lift-tipper or the like. The dough divider has a dough piece discharge at 24, where the cut dough pieces are transferred to a belt rounder 25. The dough pieces, after having been worked through the belt rounder 25, enter the automatic loading device of a central fermenting unit or proofer 3, where the dough pieces are deposited one by one into a large number of dough pockets moving slowly through the proofer on one or several proofing trains.

The proofer 3 represents the central unit of the automatic dough makeup line of the invention. Its loading device 26 may be of a known type, using a tiltable conveyor belt with a microswitch at its discharge end which, at the arrival of a dough piece near the discharge end, stops the motion of the conveyor belt. As soon as an empty dough pocket of the proofer arrives underneath the tiltable conveyor belt, it activates a tilting motion of the conveyor belt, with the result that the dough piece is transferred into the empty dough pocket over a suitable chute. The removal of the particular dough piece from the microswitch causes the conveyor belt to resume its movement and to advance another dough piece to the discharge side.

The dough pocket trains 3' of the proofer may be arranged either in parallel or in series to one another, the automatic loading device 26 being adapted accordingly. In the case of a parallel arrangement of the proofing trains 31', the loading device 26 includes a mechanism for the selective deposition of dough pieces to each of the several proofing trains, each dough piece remaining in its respective dough pocket 3" during its entire stay inside the proofer. In a series-type arrangement of the proofing trains, on the other hand, all the dough pieces are initially loaded into the pockets of the first proofing train. After travelling the length of the first proofing train, the dough pieces are transferred to a second proofing train, and later to each subsequent proofing train. These transfers take place inside the proofer itself. Although the proofing trains are thus operating in series as far as their loading and discharge is concerned, they are preferably arranged parallel and side by side inside the proofer.

The proofing time required for the makeup of barbary bread, taftoun bread and European bread is approximately 13 minutes. The weight of the corresponding dough pieces varies between 250 and 1200 grams. The proofing unit described in connection with this invention is preferably designed to process 1000 dough pieces per hour. Such a proofer would therefore have to have in excess of 200 dough pockets 3" on its proofing trains.

Figure 2:
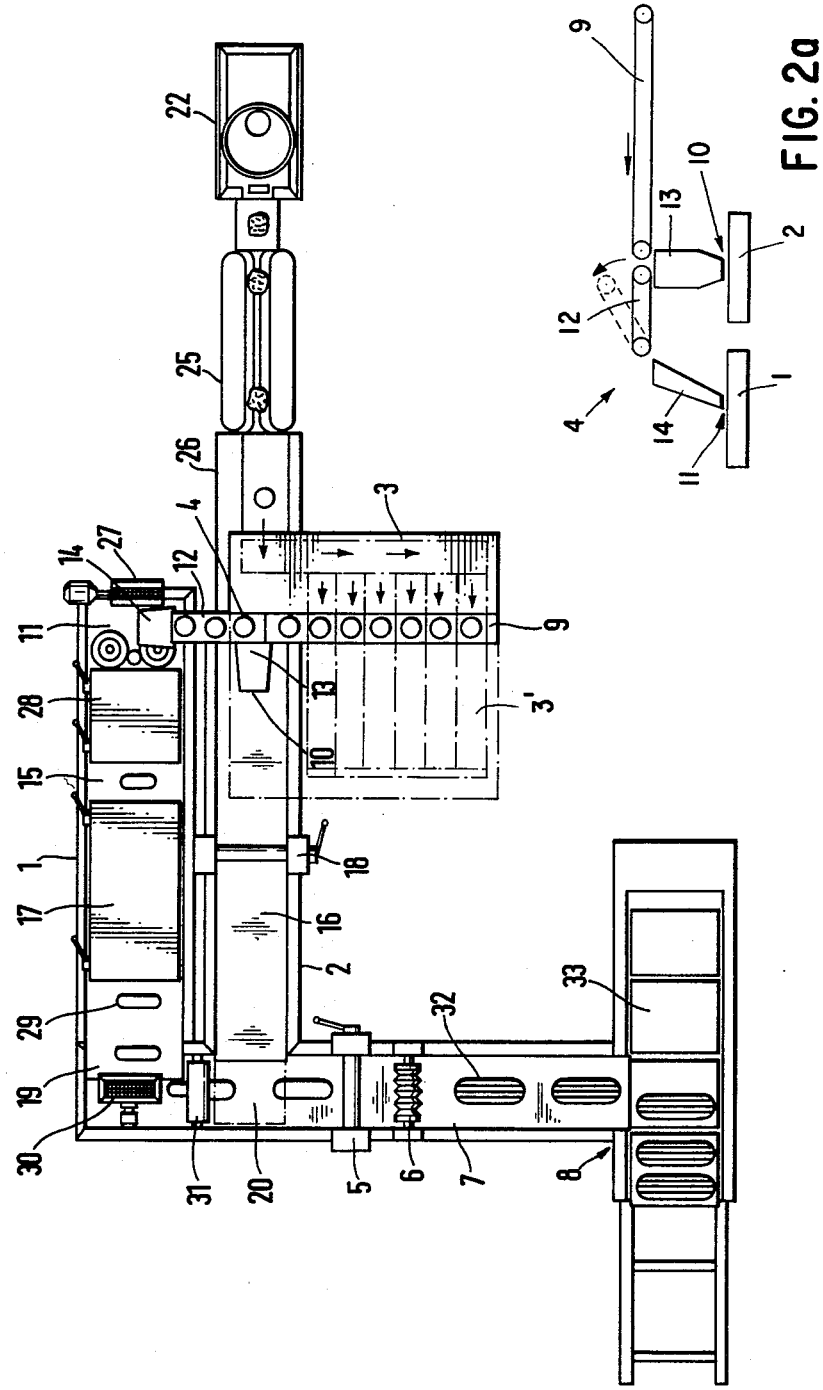
FIG. 2 shows a schematic plan view of the dough makeup line of FIG. 1, set for operation of the first longitudinal dough molding line, for the production of barbary bread.
Figure 3:
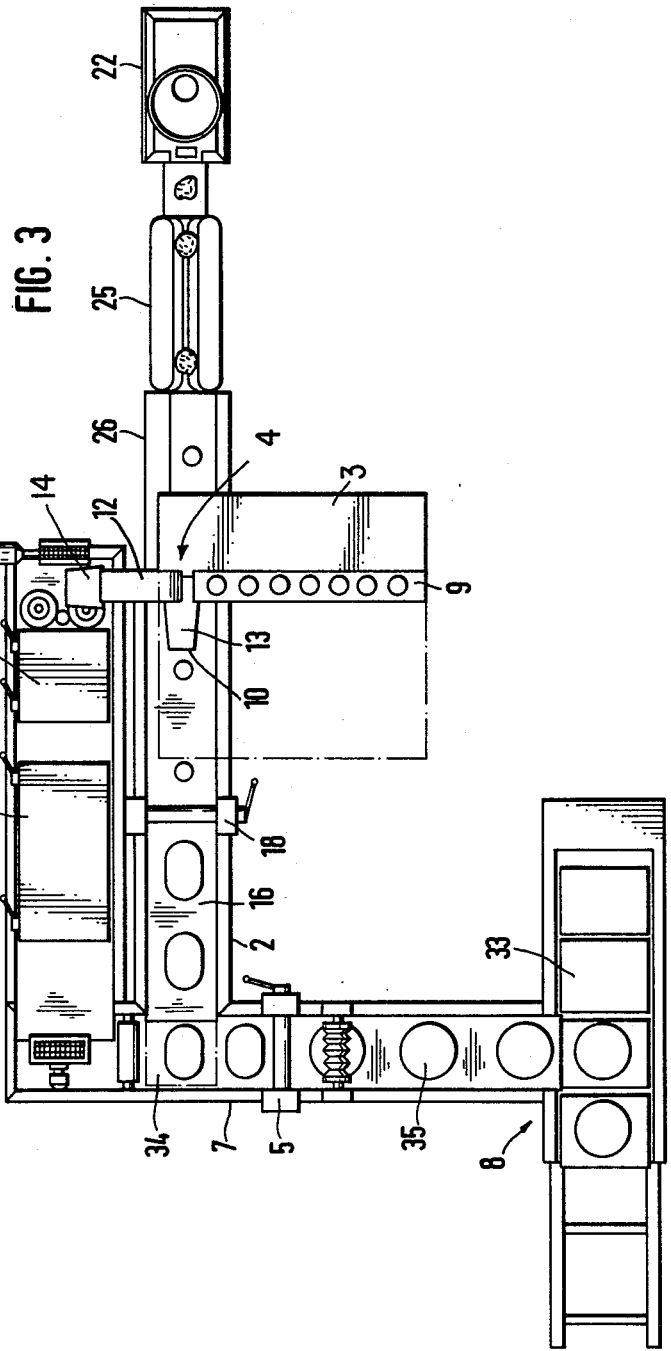
FIG. 3 shows the equipment of FIG. 2, set for operation of the second longitudinal dough molding line, for the production of large flat bread, such as taftoun bread.

As can best be seen in FIGS. 2, 2a and 3, the proofer 3 is equipped with a special dough piece delivery device 4, capable of guiding the proofed dough pieces to the one or the other of two longitudinal dough molding lines 1 and 2 which are arranged side by side in parallel alignment. A third, transversely oriented dough molding line 7 is designed to receive the partially molded dough pieces from either of the two longitudinal dough molding lines. A loading device for baking palettes, arranged at the discharge end of the third dough molding line, receives the fully molded dough pieces through the action of an intermediate transfer device, the operation of the palette loading device and dough piece transfer device being described in greater detail further below.

As can be seen in FIG. 2a, the dough piece delivery device 4 of the proofer 3 consists essentially of a horizontal conveyor belt 9, leading to a first dough piece delivery station 10 on the longitudinal dough molding line 2, and a second pivotable or otherwise disengageable conveyor belt 12 which, in its operating position, cooperates with the conveyor belt 9 in such a way that the dough pieces bypass the first dough piece delivery station 10 and move on to a dough piece delivery station 11 on the longitudinal dough molding line 1. Each dough piece delivery station features a dough chute 13 or 14, respectively, over which the discharged dough pieces slide onto a conveyor belt of the particular dough molding line 1 or 2, depending on the setting of the conveyor belt 12. The two longitudinal dough molding lines 1 and 2 have horizontal conveyor belts 15 and 16, respectively, which move at right angles to the belts of the dough piece delivery device 4. The latter is thus quickly and conveniently switchable for delivery of the dough pieces to one or the other of the two longitudinal dough molding lines.

For instance, if the equipment is to be used for the makeup of barbary bread, the switchable conveyor belt 12 is moved into its operating position, so that the dough pieces bypass the first dough chute 13 above the delivery station 10 of the molding line 2, being discharged instead at the delivery station 11 of molding line 1. At the starting point of the dough molding line 1 is arranged a flour dusting device 27 applying flour to the conveyor belt 15 at the place where the dough pieces come to rest, as they slide down the dough chute 14. Along the path of the dough molding line 1 are arranged two molding units 28 and 17 which are designed to work the rounded, proofed dough pieces into the oblong shape required for long bread. One such dough piece is indicated at 29. The first molding unit 28 is preferably of the pressure plate type, and the second molding unit 17 is preferably a stretch-molding unit which has a counter-travelling belt 17'. Additionally, this second unit may also be equipped with pressure plates.

After arriving at the end of the dough molding line 1, the partially molded dough pieces 29 are transferred to the transversely oriented dough molding line 7, whose take-up end is positioned underneath the discharge end of the longitudinal dough molding line 1. A flour dusting device 30 again deposits flour under the transferred dough pieces.

Along the path of the transverse dough molding line 7 are arranged several dough piece rolling stations, a first rolling station being shown at 31, additional rolling stations being shown at 5 and 6. The gap of these rolling stations is preferably adjustable. The rolling station 6 shows a specially shaped upper roller, having annular grooves and ridges for the impression of longitudinal grooves into the dough pieces. A grooved, molded dough piece for barbary bread is shown at 32 in FIG. 2.

Just outside the discharge end of the transverse dough molding line 7 is arranged a palette loading device 8 which holds a number of baking palettes 33 onto which the molded dough pieces are to be deposited. In the case of barbary bread, for example, it may be desirable to arrange two dough pieces on each baking palette, as is shown in FIG. 2. This procedure requires means for moving each baking palette into a first loading position in which it receives a first dough piece and into a second loading position for the second dough piece. These positioning means may be of the mechanical type, or the baking palettes may be positioned manually by an operator.

While FIG. 3 shows the same dough piece makeup line as FIG. 2, the illustrated molding of dough pieces on the longitudinal dough molding line 2 indicates that the switchable conveyor belt 12 of the dough piece deliver device 4 has been moved away from the delivery conveyor belt 9 of the proofer 3 (dotted position in FIG. 2a). It follows that the dough pieces now leave the proofer over the dough chute 13 which leads to the dough piece delivery station 10 on that dough molding line 2 which is designed for the production of flat bread such as taftoun bread, for example. For this purpose, the dough molding line 2 is equipped with a rolling station 18 in which the previously round dough pieces are flattened into oblong flat cakes. In order to finally obtain taftoun bread, which has a diameter of approximately 360 mm, these intermediate oblong dough pieces must have a major axis in excess of 360 mm.

The long thin flat-cake dough pieces present some problems in the transfer from the longitudinal dough molding line 2 to the transversely running third dough molding line 7. To avoid the creation of folds on the thin dough pieces, it is therefore necessary to operate the equipment intermittently and to provide at the intersection between the two dough molding lines a special dough piece transfer belt 34. This transfer belt, while holding a flattened dough piece above the place where it is to be deposited onto the transverse dough molding line, executes a retracting motion with its end roller on the delivery side, thereby retracting the transfer belt from underneath the dough piece, as the latter is gently lowered to the transverse conveyor belt. The flat dough pieces then move along the transverse conveyor belt, where they pass through the rolling station 5 which gives them a generally circular outline of 360 mm diameter, the previously longer major axis for the oblong dough pieces being correspondingly shortened by this rolling operation. Such a circular finished dough piece is shown at 35 in FIG. 3.

The large diameter of the flat dough pieces obtained with the equipment setting of FIG. 3 limits the capacity of the baking palettes 33 to just one dough piece per palette. The safe transfer of the finished dough pieces 35 to the baking palettes 33 again requires a special dough piece transfer device, in order to prevent tearing or folding of the extremely thin dough pieces. Such a dough piece transfer device is described in more detail further below, in connection with a second embodiment of the invention which is shown in FIGS. 4 and 5.

Figure 4:
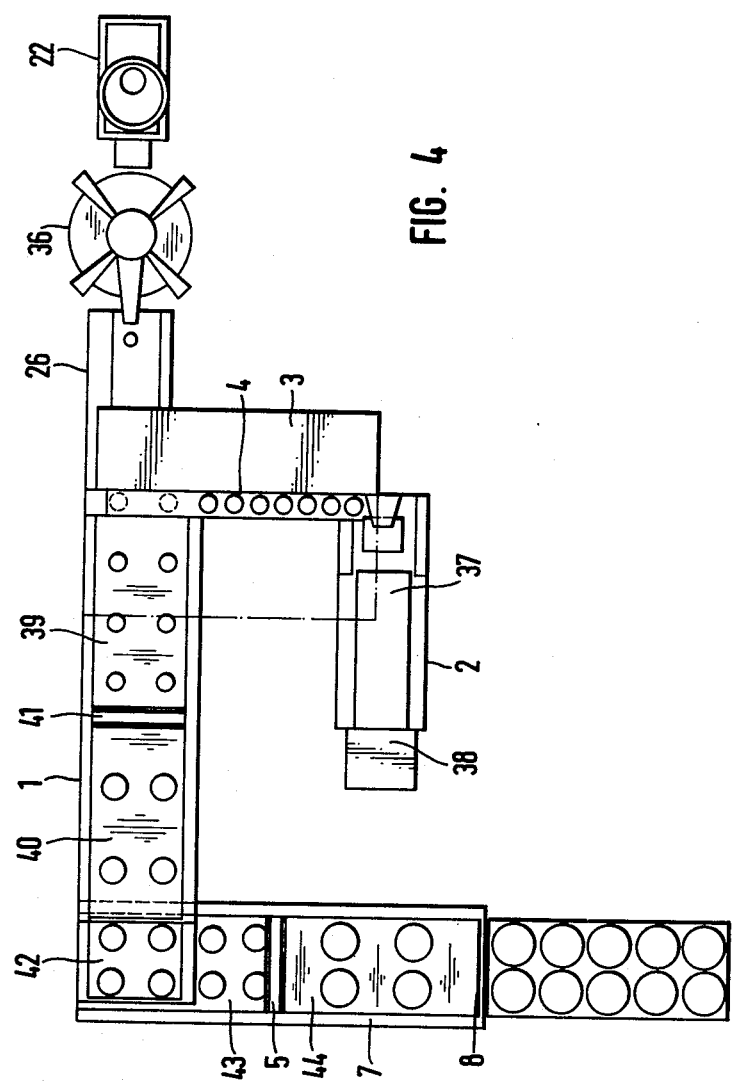
FIG. 4 shows a schematic plan view of a different dough makeup line, representing another embodiment of the invention, for the selective production of European bread and small flat bread.

In FIGS. 4 and 5 is illustrated an embodiment of the invention which, like the first-described embodiment, has two selectively engageable longitudinal dough molding lines for the makeup of either a small flat bread or of so-called European bread. Referring to the plan view illustration of FIG. 4, the makeup line begins with a dough divider 22 which is followed by a rotary rounder 36, from where the rounded dough pieces are fed to the automatic loading device 26 of a proofer 3. The proofer 3 is again equipped with a selectively switchable dough piece delivery device 4, discharging the proofed dough pieces to the one or the other of two longitudinal dough molding lines 1 and 2. In this case, the dough molding line 1 is equipped for the simultaneous makeup of two rows of dough pieces which are flattened to become small flat bread. The dough molding line 2 consists essentially of a stretch molder 37 for the makeup of European bread. The molded dough pieces reach the dough piece delivery station 38 in a single row, after passing through the stretch molder 37.

In the dough molding line 1 of FIG. 4 is arranged a rolling station 41, two rows of dough pieces being fed to the rolling station on a conveyor belt 39, while another conveyor belt 40 carries the flattened dough pieces to the transverse dough molding line 7. The rolling action in the rolling station 41, by increasing the surface area of the dough pieces, also increases the speed with which the flattened pieces leave the rollers of the rolling station 41. It therefore becomes necessary, in order to avoid the creation of folds in the flattened dough pieces, to operate the second conveyor belt 40 at a higher speed than the first conveyor belt 39. Ideally, the ratio between the two conveyor belt speeds is 2 to 3, meaning that the conveyor belt 40 moves 50 percent faster than the conveyor belt 39.

It follows from this increase in the conveying speed of the dough pieces that their spacing is correspondingly increased by 50 percent over the spacing at which the dough pieces are deposited on the first conveyor belt 39. The greater spacing between successive dough pieces, however, represents a disadvantage, especially where two or more rows of dough pieces are to be placed on a single baking palette. The spacing between dough pieces on the baking palettes should obviously be as close as possible, in order to make the best use of the oven space available.

The present invention offers a convenient way to change the spacing between the dough pieces, by suggesting the arrangement of a special transfer device at the end of the first dough molding line 1 which deposits the flattened dough pieces on the transverse dough molding line 7 in such a way that the dough piece spacing is reduced to the desired distance. The operation of this transfer device will be explained in more detail with reference to FIG. 5.

In FIG. 5 is shown schematically a longitudinal view of the first dough molding line of FIG. 4, extending between the proofer 3 and the transverse dough molding line 7. As can be seen in FIG. 5, the transfer device 42 consists essentially of a conveyor belt receiving the flattened dough pieces from the dough molding line and reaching over the conveyor belt of the transverse dough molding line 7. The transfer device 42 operates as follows: As soon as the first pair of flattened dough pieces reaches a position just above the place where they are to be deposited on the transverse conveyor belt underneath, the transfer conveyor belt is stopped and the end roller 42° of the transfer device is retracted, while the conveyor belt is held taut by three pickup rollers. The transfer conveyor belt is thus moved away from under the first pair of dough pieces, which are thereby gently deposited onto the conveyor belt of the transverse line 7.

A second pair of flattened dough pieces is similarly deposited by the movable transfer conveyor belt alongside the first-deposited dough pieces, but, before doing so, the transfer conveyor belt is advanced a distance which corresponds to the desired reduction in spacing between the two pairs of dough pieces. Following the transfer of the two pairs of dough pieces, the conveyors of both dough molding lines resume their movements, processing two more pairs of dough pieces.

While moving along the transverse dough molding line 7, the dough pieces 43 are further flattened, as they pass through the rolling station 5. This flattening action agains makes it necessary for the conveyor belt 44 behind the rolling station to move at a higher speed than the conveyor belt 43 ahead of the rolling station. The difference in conveying speeds is again prefereably a 50-pecent increase, resulting in a corresponding increase in the spacing between the flattened dough pieces on the conveyor belt 44 (FIG. 4). It follows that, in order to achieve the desired optimal spacing of the dough pieces on the baking palettes, it is necessary to arrange another transfer device at the end of the transverse line 7 which is capable of changing the transverse spacing between successive pairs of dough pieces. Such a transfer device is shown in FIG. 6, where the transverse dough molding line 7 of FIG. 4 is illustrated schematically.

The transfer device which deposits the flattened dough pieces on the baking palettes 33 is assoicated with a chain conveyor 35 which is arranged underneath the belt conveyor 44 and in horizontal alignment with the palette loading device 8. The chain conveyor 45 is reversible in its movement and includes for this purpose an electrically controlled clutch 48 connecting it to the forward drive 47 which drives the rolling station 5 and the conveyors 43 and 44. A reverse drive 46 with a free-wheeling clutch 49 provides the reverse movement for the chain conveyor 45. An empty baking palette 33 is first retracted underneath the transfer conveyor 44, using either the chain conveyor 45 or a manual operation of an attendant. The transfer of the first pair of dough pieces takes place as the transfer conveyor belt 44 and the palette underneath it move at identical speeds in the same direction, thereby gently depositing two dough pieces in the first position on the palette 33. An immediate continuation of this movement of the two conveyors would cause the second pair of dough pieces to be deposited on the palette with the same spacing they have on the transfer conveyor belt 44. In order to reduce this spacing by the amount desired, it is therefore necessary that the baking palette 33 execute a back-up motion before the second pair of dough pieces is deposited on it. This back-up motion is produced by the operation of the reverse drive 46 and its electric clutch 48. These transfer operations are repeated until the baking palette 33 is completely loaded with dough pieces, whereupon it is removed sideways by the palette loading device 8 and a new palette is inserted on the chain conveyor underneath the transfer device 44. The displacement distance of the chain conveyor 45 for the baking palette is preferably adjustable, in order to accommodate the differences in size and spacing of the various dough piece shapes.

As an alternative to the two drives for the chain conveyor 45 which are shown in FIG. 6, it is also possible to provide the desired pilgrim-step motion of the chain conveyor by means of an indexing device, using, for example, a Geneva drive to intermittently advance the transfer conveyor belt 44 and the chain conveyor 45, while a return spring executes the back-up motion of the chain conveyor between movement cycles. The length of the spring-actuated back-up movement is conveniently adjustabel by means of an adjustable stop.

It should be understood that the first-described embodiment of the invention, as illustrated in FIGS. 1-3, uses a similar dough piece transfer action between the longitudinal dough molding lines and the transverse dough molding line, on the one hand, and between the transverse dough molding line and the baking palette, on the other hand. In this case, however, there is no need for a change in the spacing between successive dough pieces, since only one dough piece is put on each baking palette in the case of large flat bread such as taftoun bread, and two dough pieces are placed side by side in the case of some long breads such as barbary bread.

The present invention thus makes it possible to produce a variety of different bread shapes on one makeup line, using a minimum of equipment components and floor space. The makeup line is readily and quickly convertible from one kind of bread to another. The proposed equipment further includes means for effecting the loading of baking palettes with an optimal spacing between multiple rows of dough pieces, the equipment having the necessary adjustability which makes such optimal settings possible.

It should be understood, of course, that the foregoing disclosure describes only preferred embodiments of the invention and that it is intended to cover all changes and modifications of these examples of the invention which fall within the scope of the appended claims.

I claim the following:

1. A dough makeup line for the selective mechanized processing of a mass of bread dough into molded dough pieces of one of several sizes and shapes, for different kinds of bread, which are to be baked in a bread baking oven, the makeup line comprising in combination:

means for dividing the mass of dough into a succession of dough pieces and means for rounding the dough pieces;

a proofer for the fermenting of the rounded dough pieces, the proofer including a dough piece delivery device; and at least two dough piece molding lines extending away from the proofer, the molding lines including dough piece conveying means and dough piece molding means adapted to shape the dough pieces in different ways; and wherein the dough piece delivery device of the proofer includes means for selectively setting the delivery of the proofed dough pieces so as to take place to the one or the other of the dough piece molding lines.

2. A dough makeup line as defined in claim 1, wherein the dough piece delivery device of the proofer includes, as part of its delivery setting means, a first delivery conveyor belt leading to a first delivery station located above a first one of the dough piece molding lines; and a second delivery conveyor belt leading to a second delivery station located above a second one of the dough piece molding lines, the second delivery conveyor belt being insertable into an operative position in which it forms a continuation of the first delivery conveyor belt, thereby conveying the dough pieces past the first delivery station to the second delivery station, the second conveyor belt being removable from said operative position to free the first delivery station.

3. A dough makeup line as defined in claim 2, wherein the dough piece delivery device includes, at the first and second dough piece delivery stations, dough chutes leading from the discharge ends of the first and second delivery conveyor belts to the associated first and second dough piece molding lines; and the second delivery conveyor belt is arranged to be removable out of its operative position by a pivoting motion about its discharge end.

4. A dough makeup line as defined in claim 1, wherein the proofer comprises:

a fermenting compartment;

a plurality of proofing trains moving slowly through the fermenting compartment and having a succession of dough pockets, each pocket carrying a dough piece; and a proofer loading device associated with the proofing trains, said device including means for loading a dough piece into each dough pocket of the proofing trains.

5. A dough makeup line as defined in claim 4, wherein the proofing trains are arranged for parallel operation, and the proofer loading device includes means for moving the proofer loading means from proofing train to proofing train.

6. A dough makeup line as defined in claim 4, wherein the proofing trains are arranged for operation in series, and the proofer loading device includes means for successively transferring the dough pieces from one proofing train to another.

7. A dough makeup line as defined in claim 1, wherein the conveying means of the longitudinal dough piece molding lines include at least one horizontal conveyor belt in each line; and the dough piece molding means include, on one of the longitudinal dough piece molding lines, means for molding the dough pieces into an oblong shape, said molding means including a pressure molder and, behind the latter, a stretch molder having a counter-travelling belt cooperating with the conveyor belt of the dough piece molding line.

8. A dough makeup line as defined in claim 7, wherein the dough piece molding means include, on at least one of the longitudinal dough piece molding lines, a rolling station for the flattening of dough pieces.

9. A dough makeup line as defined in claim 1, wherein said dough piece molding lines are arranged longitudinally side by side; and the dough makeup line further comprises:

a transversely oriented dough piece molding line arranged to receive dough pieces from either of said longitudinal lines, and including dough piece conveying means and dough piece molding means for further shaping the dough pieces;

transfer means for loading the shaped dough pieces onto a succession of dough piece carriers; and a makeup line drive including drive connections linking together the proofer, its dough piece delivery device, one of the longitudinal dough piece molding lines, the transverse dough piece molding line, and the transfer means.

10. A dough makeup line as defined in claim 9, wherein the dough piece molding means of the transverse dough piece molding line includes at least one rolling station.

11. A dough makeup line as defined in claim 10, wherein said dough piece molding means includes at least two rolling stations, and at least one rolling station includes a vertically adjustable molding roll having annular grooves in its surface.

12. A dough makeup line as defined in claim 9, further comprising:

line transfer means associated with at least one of the longitudinal dough piece molding lines for transferring dough pieces from said longitudinal line to the transverse dough piece molding line.

13. A dough makeup line as defined in claim 12, wherein the line transfer means includes a horizontal transfer conveyor belt as part of the longitudinal dough piece molding line, a portion of said conveyor belt extending above the transverse dough piece molding line and running around a belt roller of very small diameter, the belt roller and the lower belt portion being retractable longitudinally from under the dough pieces, thereby depositing the dough pieces on the transverse dough piece molding line underneath it.

14. A dough makeup line as defined in claim 13, wherein said transfer conveyor belt includes means for depositing two rows of dough pieces side by side on the transverse dough piece molding line, at a spacing which is smaller than the longitudinal dough piece spacing on the transfer conveyor belt.

15. A dough makeup line as defined in claim 9, wherein the dough piece carriers are baking palettes;

the transverse dough piece molding line includes at least one conveyor belt;

the loading transfer means is arranged at the discharge end of said conveyor belt and includes: a palette loading device located adjacent the discharge end of said conveyor belt and accommodating a succession of baking palettes, and a palette conveyor located underneath said conveyor belt; and the palette conveyor includes reversible conveyor drive means for the retraction of a baking palette underneath said conveyor belt and for the subsequent advancement of said palette in synchronism with the conveyor belt, as dough pieces are transferred from the conveyor belt onto the baking palette.

16. A dough makeup line as defined in claim 15, wherein the reversible drive means of the palette conveyor includes, for the synchronous advancement of the baking palettes, a drive connection with said conveyor belt of the transverse dough piece molding line and an electrically operable clutch controlling said drive connection.

17. A dough makeup line as defined in claim 16, wherein the reversible drive means of the palette conveyor includes, for the retraction of the baking palettes underneath the conveyor belt, a reversing motor and a free-wheeling clutch connecting said motor to the palette conveyor in such a way that a drive connection is only then established when the motor is running.

18. A dough makeup line as defined in claim 15, wherein the reversible drive means of the palette conveyor includes means for imparting to said conveyor a retracting motion between transfers of dough pieces to a baking palette, so as to deposit the dough pieces onto the baking palette with a closer spacing than that which they have on said conveyor belt of the transverse dough piece molding line.

19. A dough makeup line as defined in claim 1, further comprising:

a rolling station in at least one dough piece molding line for the flattening of the dough pieces, said dough piece molding line including separate conveyor belts ahead of and behind the rolling station, and a conveyor belt drive imparting different speeds to the two conveyor belts, the one behind the rolling station running faster than the one ahead of it.

20. A dough makeup line as defined in claim 19, wherein said conveyor belt drive is so arranged that the conveyor belt behind the rolling station moves approximately 50 percent faster than the conveyor belt ahead of the rolling station.

* * * * *